(12) United States Patent
Seleznev et al.

(10) Patent No.: US 9,191,204 B2
(45) Date of Patent: Nov. 17, 2015

(54) ENCRYPTION KEY DISTRIBUTION METHOD IN MOBILE BROADCASTING SYSTEM AND SYSTEM FOR THE SAME

(75) Inventors: Sergey Nikolayevich Seleznev, Gyeonggi-do (KR); Byung-Rae Lee, Seoul (KR); Sung-Oh Hwang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 588 days.

(21) Appl. No.: 12/997,857

(22) PCT Filed: Jun. 10, 2009

(86) PCT No.: PCT/KR2009/003123
§ 371 (c)(1),
(2), (4) Date: May 11, 2011

(87) PCT Pub. No.: WO2009/151281
PCT Pub. Date: Dec. 17, 2009

(65) Prior Publication Data
US 2011/0206205 A1    Aug. 25, 2011

(30) Foreign Application Priority Data
Jun. 11, 2008    (KR) .......................... 10-2008-0054828

(51) Int. Cl.
*H04L 9/08*    (2006.01)
*H04L 29/06*    (2006.01)
(Continued)

(52) U.S. Cl.
CPC ............ *H04L 9/0891* (2013.01); *H04L 63/068* (2013.01); *H04N 7/1675* (2013.01); *H04N 21/26613* (2013.01); *H04W 12/04* (2013.01); *H04L 2209/601* (2013.01); *H04L 2209/80* (2013.01)

(58) Field of Classification Search
USPC ........................................................... 380/45
See application file for complete search history.

(56) References Cited

U.S. PATENT DOCUMENTS 5,963,646 A *    10/1999    Fielder et al. .................. 380/259
7,212,634 B2 *    5/2007    Briscoe ......................... 380/203
(Continued)

FOREIGN PATENT DOCUMENTS

| CN | 1947373 | 4/2007 |
|---|---|---|
| CN | 101110678 | 1/2008 |

(Continued)

OTHER PUBLICATIONS

MBMS Traffic Encryption Key gradually Changing and Updating for streaming service, Nov. 18-21, 2003, 3GPP TSG SA WG3 Security.*
(Continued)

*Primary Examiner* — Jason K. Gee
*Assistant Examiner* — Zhimei Zhu
(74) *Attorney, Agent, or Firm* — The Farrell Law Firm, P.C.

(57) ABSTRACT

A method and a system for distributing an encryption key for service protection and content protection in a mobile broadcasting system are provided where a network generates a first encryption key when a broadcasting service is first provided to the terminal, and transmits a long term key message including the generated first encryption key to the terminal. Also, the network generates a second encryption key before the lifetime of a first access value pair expires, and transmits a long term key message including the generated second encryption key to the terminal.

14 Claims, 10 Drawing Sheets

(51) Int. Cl.
*H04N 7/167* (2011.01)
*H04N 21/266* (2011.01)
*H04W 12/04* (2009.01)

(56) References Cited

U.S. PATENT DOCUMENTS

| | | | |
|---|---|---|---|
| 7,907,733 B2 | 3/2011 | Cho et al. | |
| 8,031,872 B2 * | 10/2011 | Bakshi | 380/247 |
| 8,121,296 B2 | 2/2012 | Hawkes et al. | |
| 2003/0039361 A1 | 2/2003 | Hawkes et al. | |
| 2005/0129231 A1 | 6/2005 | Kelley et al. | |
| 2005/0157876 A1 * | 7/2005 | Jeong et al. | 380/200 |
| 2006/0129805 A1 * | 6/2006 | Kim et al. | 713/158 |
| 2007/0140481 A1 * | 6/2007 | Parameswaran Rajamma | 380/37 |
| 2007/0259647 A1 | 11/2007 | Lee et al. | |
| 2008/0040618 A1 * | 2/2008 | Andersson et al. | 713/193 |
| 2008/0065892 A1 * | 3/2008 | Bailey et al. | 713/171 |
| 2008/0080713 A1 | 4/2008 | Cho et al. | |
| 2008/0205643 A1 * | 8/2008 | Chen | 380/205 |
| 2008/0219436 A1 * | 9/2008 | Chen et al. | 380/30 |
| 2009/0097659 A1 * | 4/2009 | Candelore | 380/278 |
| 2009/0164788 A1 * | 6/2009 | Cho et al. | 713/175 |
| 2009/0217034 A1 * | 8/2009 | Sudia et al. | 713/156 |
| 2009/0233578 A1 * | 9/2009 | Feder et al. | 455/410 |
| 2009/0285401 A1 * | 11/2009 | Moroney et al. | 380/278 |
| 2010/0174906 A1 * | 7/2010 | Li | 713/168 |
| 2010/0268937 A1 * | 10/2010 | Blom et al. | 713/153 |
| 2011/0004758 A1 * | 1/2011 | Walker et al. | 713/168 |
| 2011/0096929 A1 * | 4/2011 | Seleznev et al. | 380/273 |
| 2012/0102212 A1 * | 4/2012 | Sood et al. | 709/229 |
| 2012/0257746 A1 * | 10/2012 | Brown et al. | 380/44 |

FOREIGN PATENT DOCUMENTS

| | | |
|---|---|---|
| JP | 2005-537713 | 12/2005 |
| JP | 2007-531337 | 11/2007 |
| KR | 1020050089736 | 9/2005 |
| KR | 10-0684310 | 2/2007 |
| KR | 1020070089027 | 8/2007 |
| KR | 1020080021185 | 3/2008 |
| WO | WO 2005-006643 | 1/2005 |

OTHER PUBLICATIONS

E. Carrara et al., "The Key ID Information Type for the General Extension Payload in Multimedia Internet KEYing (MIKEY)", Jun. 2006, Network Working Group, Request for Comments: 4563.*

* cited by examiner

ENCRYPTION KEY DISTRIBUTION METHOD IN MOBILE BROADCASTING SYSTEM AND SYSTEM FOR THE SAME

PRIORITY

This application claims priority under 35 U.S.C. §119(a) to a Korean patent application filed on Jun. 11, 2008, and assigned Application No. 10-2008-0054828, and the benefit under 35 U.S.C. §365(c) of International Application No. PCT/KR2009/003123 filed on Jun. 10, 2009, the contents of which are incorporated herein by reference.

BACKGROUND OF THE INVENTION

1. Field of the Invention

The present invention relates generally to a mobile broadcasting system, and more particularly to a method and a system for distributing a traffic encryption key for a mobile broadcasting service that is applied to a service protection and content protection structure such as a smart card profile in an Open Mobile Alliance Broadcast (OMA BCAST).

2. Description of the Related Art

In the mobile communication market, production of new services through recombination and integration of existing technology has been in continuous demand and communication and broadcasting technology has developed to enable a broadcasting system or a mobile communication system in the related art which provides a broadcasting service through a mobile terminal (hereinafter "terminal") such as a cellular phone, a PDA, and the like. Under the conditions of latent and actual market demands, such as an abrupt increase in user requirements with respect to multimedia services, enterprise strategies that intend to provide new services such as broadcasting services in addition to the existing audio services, and interests of IT enterprises that strengthen the mobile communication business to accommodate the consumer requirements, the fusion of mobile communication services and IT technologies has occupied a position as the big flow of the next-generation mobile communication technology development.

The Open Mobile Alliance (OMA), is an application standards group which makes and researches standards for mutual interlocking of individual mobile solutions, and serves to determine diverse application standards for mobile communication games, Internet services, and the like. In particular, the OMA BCAST Working Group of the OMA Working Group has studied technologies for providing broadcasting services using terminals. Hereinafter, a broadcasting system that is discussed in the OMA BCAST Working Group (hereinafter "mobile broadcasting system") will be briefly described.

FIG. 1 is a block diagram illustrating the network configuration of a general mobile broadcasting system. In FIG. 1, a Content Creator (CC) 10 is a BCAST service content provider (hereinafter "content provider"). The BCAST service may be an existing audio/video broadcasting service, file (music file or data file) download system, and the like. A BCAST Service Application (BSA) unit 20 serves to receive a supply of BCAST service data from the content provider CC 10, processes the data in a form suitable to the BCAST network of FIG. 1, and generates the BCAST service data. The BSA unit 20 also serves to generate standardized metadata that is necessary for guiding the mobile broadcasting service. BCAST-1 to BCAST-8 are interfaces among entities.

In FIG. 1, a BCAST Service Distribution/Adaptation (BSD/A) unit 30 serves to set a bearer which will transmit the BCAST service data that is provided from the BSA unit 20, to determine a transmission schedule of the BCAST service, and to generate a mobile broadcasting guide. A BCAST Subscription Management (BSM) unit 40 manages device information on terminals that receive subscription information of subscribers for receiving the BCAST service, BCAST service providing information, and the BCAST service.

In FIG. 1, terminal 50 is a terminal that is capable of receiving the BCAST service and connecting to a cellular network according to the performance of the terminal. Broadcast network 60 is a network that transmits the BCAST service, such as a Digital Video Broadcasting—Handheld (DVB-H), a Third Generation Partnership Project Multimedia Broadcast and Multicast Service (3GPP MBMS), Third Generation Partnership Project 2 Broadcast and Multicast Service (3GPP2 BCMCS), or the like. An interaction network 70 is a network in which the BCAST service is transmitted in a one-to-one manner, or control information and additional information related to the reception of the BCAST service are bidirectionally exchanged, and for example, it may be the existing cellular network.

In general, in the BCAST service, a server that manages the broadcasting service transmits encrypted service data, and a plurality of terminals receives the data. In this case, the plurality of terminals can use the corresponding service by decrypting the encrypted service data provided from the server using a predetermined cryptographic key pre-stored in the terminals. In relation to this, a method of encrypting broadcasting content and services is briefly divided into two sides of service protection and content protection.

On the other hand, the OMA BCAST Source Production Control Parameter (SPCP) smart card profile implements a key management scheme for a mobile broadcasting service. For access provisioning, two kinds of keys, i.e. Long Term Keys (LTKs) and Short Term Keys (STKs) are defined. The LTKs are used to perform conditioning of accesses for the STKs by encrypting the STKs according to the LTKs based on the user service subscription plan. The STKs are used for the actual traffic encryption. Although the LTKs and the STKs should be periodically updated, the lifetime of the LTKs is far longer than the lifetime of the STKs. The LTKs are provided to a user by the BSM, and the STKs are transmitted to a user by the BSD/A unit 30. Such a key management scheme is problematic in that frequent STK updates increase high bandwidth consumption.

Hereinafter, key management in a smart card profile will be described in detail.

FIG. 2 is a diagram illustrating a key hierarchy defined in a general smart card profile.

A Subscription Management Key (SMK) 120 is derived as the result of user authentication according to the reception of registered keys 110, and protects the LTK transferred through a Long Term Key Message (LTKM). The LTKs of the smart card profile may include a Service Encryption Key (SEK) 130 and Program Encryption Keys (PEKs). These two kinds of keys have different lifetimes to support different service access scenarios.

The SEK 130 is provided to a user who has subscribed to the service. That is, as successive authentication is performed, content and periodically updated SEKs are continuously provided to the user even without a separate request. This scenario is also called "subscription-based access".

The PEKs 140 are provided to a user whose access to a certain service is limited to a program that has a specified time interval or service unit. In order to obtain access qualifications for the next program or the consequent time interval, a user should make an additional purchase request. The program or the time interval may be related to one or more PEKs. This scenario is called "Pay-Per-View (PPV)-based access".

A Traffic Encryption Key (TEK) 150 is the STK which is carried through a Short Term Key Message (STKM), and encrypted by the SEK. Also, the TEK is carried through the STKM and is encrypted according to the PEK 140. The STKM is authenticated using the PEK 140 that is carried through the STKM and is encrypted according to the SEK 130. The TEKs 150 are frequently updated for security.

FIG. 3 is a diagram illustrating the supply flow of SEKs and TEKs under general subscription-based access conditions.

Under the subscription-based access conditions, the lifetime of the SEK (SEK LT) is calculated as n multiplied by the lifetime of the TEK. Before the SEK ($SEK_{y-1}$) expires, the BSM generates and transmits a new $SEK_y$ to a subscribed user in the LTKM in step 210. The $SEK_y$ is encrypted according to SMK1 that is shared only between the user and the BSM. After the SEK ($SEK_{y-1}$) expires, the PEKs which are carried together with $TEK_{x+1}$ to $TEK_{x+n}$ through the STKM are encrypted by the $SEK_y$. Also, before the $SEK_y$ expires, The BSM generates and transmits a new $SEK_{y+1}$ to a subscribed user in step 220.

FIG. 4 is a diagram illustrating the supply flow of SEKs and TEKs under general PPV-based access conditions.

Under the PPV-based access conditions, the lifetime of the PEK (PEK LT) is calculated as m multiplied by the lifetime of the TEK (where, m≤n). Also, in this embodiment, the lifetime of the PEK is PEK LT=0.5*SEK LT. Accordingly, the PEK should be updated more frequently than the SEK, e.g. twice as frequently as the update of the SEK.

If a user issues two purchase requests with respect to the two consequent time intervals which are related to $PEK_z$ and $PEK_{Z+1}$, the BSM transmits the LTKM including the $PEK_z$ to a user in step 310 before the $TEK_{x+1}$ (the first TEK related to $PEK_z$) is used. The $PEK_z$ is encrypted according to the $SMK_2$ that is shared only between the user and the BSM. Also, the BSM transmits the LTKM including the $PEK_{z+1}$ to a user in step 320 before the $TEK_{x+m+1}$ (the first TEK related to $PEK_{z+1}$) is used. However, if no further purchase request is issued by the user before the $TEK_{x+n+1}$ is used, the BSM does not transmit the PEK for the $TEK_{x+n+1}$ to the user, and thus the user cannot decode the TEKs starting from $TEK_{x+n+1}$.

SUMMARY OF THE INVENTION

The present invention has been made to address at least the above-mentioned problems and/or disadvantages, and to provide at least the advantages described below. Accordingly, an aspect of the present invention provides a method and a system for distributing a traffic encryption key (TEK) in a mobile broadcasting system.

In accordance with an aspect of the present invention, there is provided a method of distributing an encryption key for protecting a broadcasting service that is broadcast to a terminal in a mobile broadcasting system, which includes a network generating a first encryption key when the broadcasting service is first provided to the terminal, and transmitting a long term key message including the generated first encryption key to the terminal; and the network generating a second encryption key before the lifetime of a first access value pair expires, and transmitting a long term key message including the generated second encryption key to the terminal.

In accordance with another aspect of the present invention, there is provided a method of distributing an encryption key for protecting a broadcasting service that is broadcast to a terminal in a mobile broadcasting system, which includes verifying a long term key message using a subscriber management key if the long term key message is received from a network; performing a replay detection if the long term key message is valid; confirming validity of an encryption key included in the long term key message using a security function if the replay detection succeeds; and decoding the encryption key, generating and storing a TEK from the encryption key if the encryption key is valid.

In accordance with still another aspect of the present invention, there is provided a mobile broadcasting system for protecting a broadcasting service, which includes a network generating a first encryption key when the broadcasting service is provided, transmitting a long term key message including the generated first encryption key, generating a second encryption key before the lifetime of a first access value pair expires, and transmitting a long term key message including the generated second encryption key; and a terminal verifying the long term key message received from the network, decoding the encryption key included in the long term key message using a security function, and generating and storing a traffic encryption key from the encryption key.

BRIEF DESCRIPTION OF THE DRAWINGS

The foregoing and other objects, features and advantages of the present invention will become more apparent from the following detailed description when taken in conjunction with the accompanying drawings in which.

Figure 1:
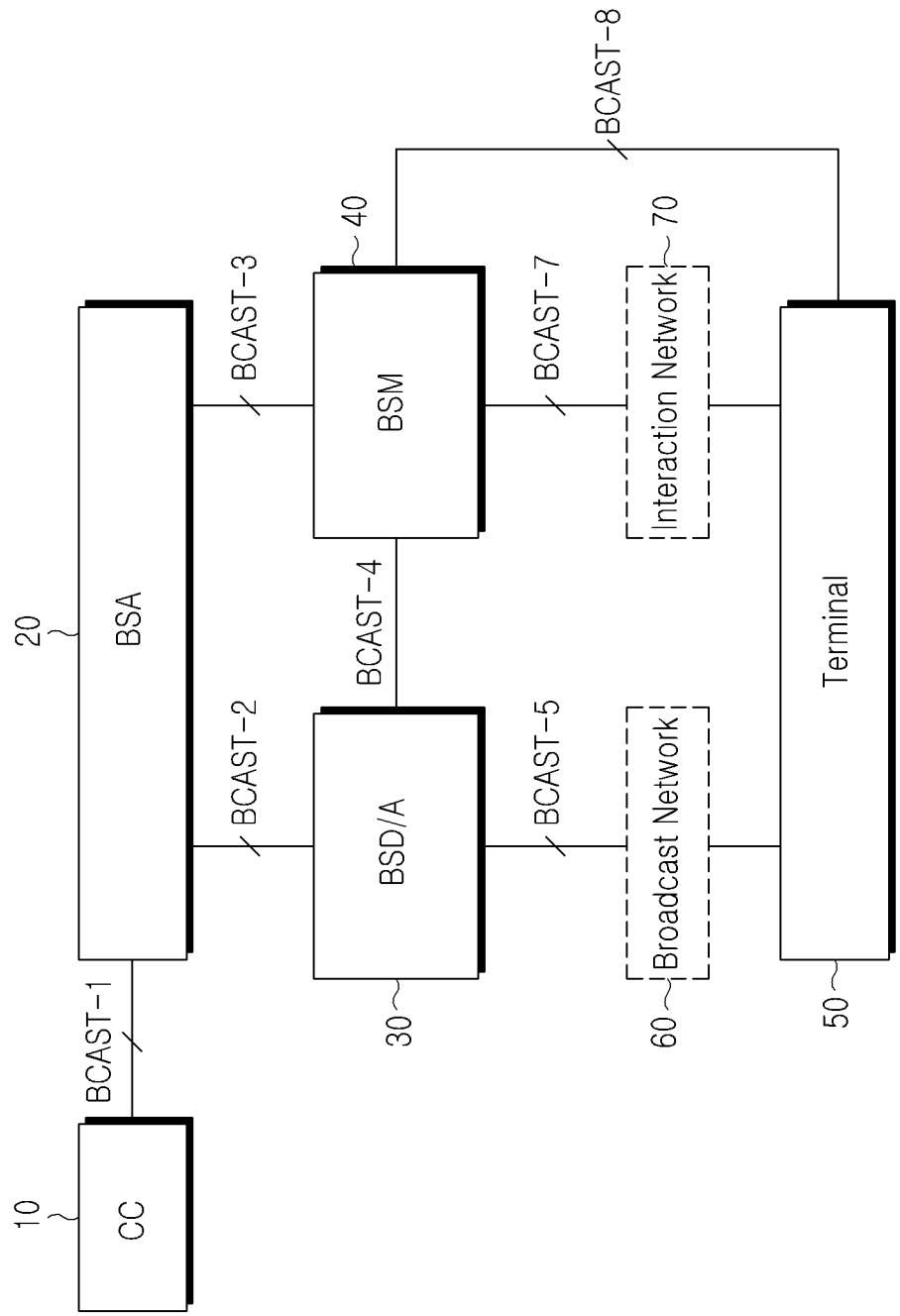
FIG. 1 is a block diagram illustrating the configuration of a network in a general mobile broadcasting system.
Figure 2:
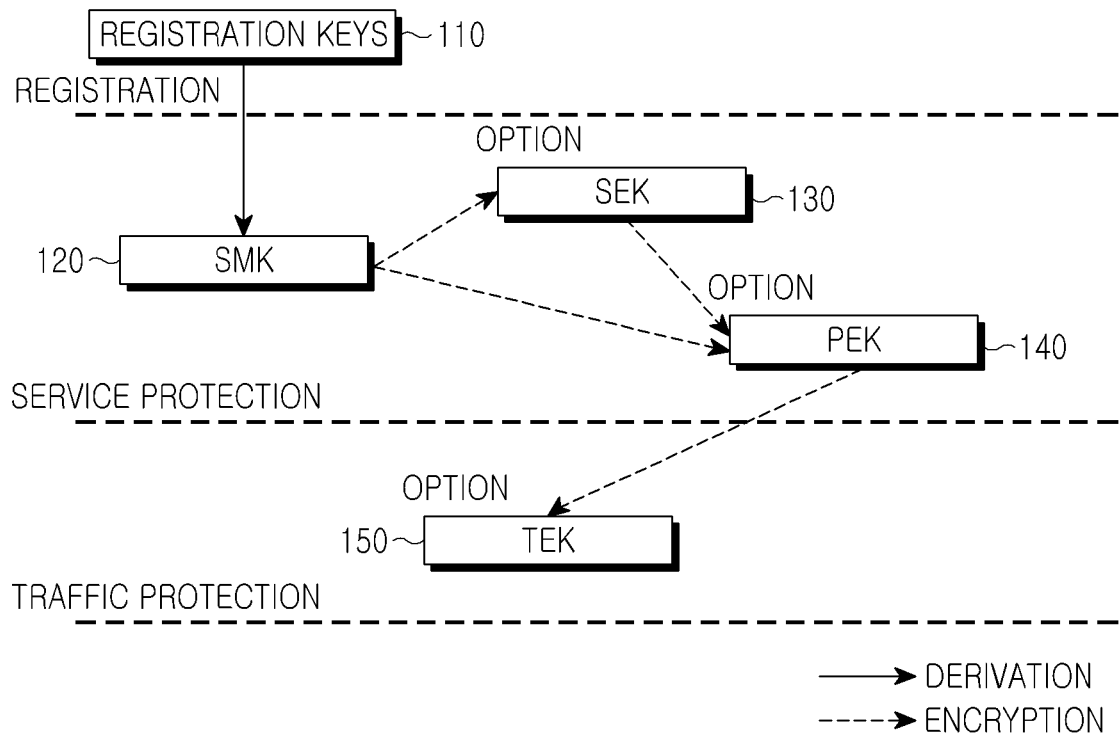
FIG. 2 is a block diagram illustrating a key hierarchical structure of a general smart card profile.

DETAILED DESCRIPTION OF EMBODIMENTS
OF THE PRESENT INVENTION

Embodiments of the present invention are described in detail with reference to the accompanying drawings. In the following description, the same elements will be designated by the same reference numerals although they are shown in different drawings. Further, various specific definitions found in the following description, such as specific values of packet identifications, contents of displayed information, etc., are provided only to help the general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

In the present invention, service access scenarios are maintained without any change, and SEK and PEK are replaced by an Access Value Pair (AVP). The AVP is calculated using an arbitrary value pair which is called a Key Seed Pair (KSP) that is arbitrarily generated in a BSM. The AVP is used to derive a plurality of TEKs. Through this, in the present invention, a key hierarchical structure is updated, a method of identifying the TEK is changed, and the STKMs are removed. Accordingly, it is not necessary to transmit further TEKs. Also, an LTKM format is corrected to include a TEK Identifier (ID), access criteria, attributes linked to content previously carried through the STKM, and the AVP. Also, according to the present invention, the LTKM is processed by a smart card, and a terminal transmits a new TEK request message to the smart card.

Figure 5:
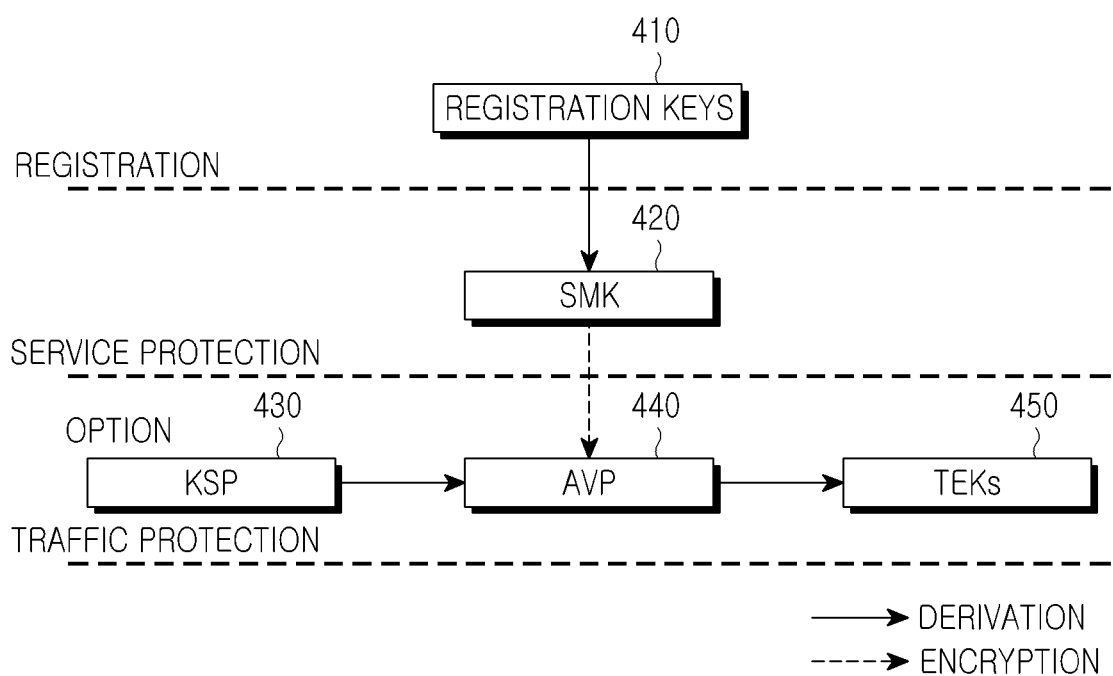
FIG. 5 is a block diagram illustrating a key hierarchical structure according to an embodiment of the present invention.

FIG. 5 is a flowchart illustrating the key hierarchical structure according to an embodiment of the present invention.

Although SMK 420 is derived from registration keys 410 in the same manner as in the related art, SEK and PEK are replaced by AVPs 440. The AVP 440 replacing the SEK is called a Service AVP (SAVP), and the AVP 440 replacing the PEK is called a Program AVP (PAVP).

Also, KSP 430 is a pair composed of $\{KS_1, KS_2\}$, and if it is assumed that $KS_1$ and $KS_2$ are arbitrarily generated in the BSM and the total number of TEKs 450 which may be generated from the SKP 430 is n, the AVP 440 can be calculated by two methods as follows.

1. In the case where a user is permitted to generate n TEKs:

$$AVP=KSP=\{KS_1, KS_2\}$$

2. In the case where a user is permitted to generate m TEKs (m<n):
1) A hash function is applied to $KS_1$ n iterations, and the sequence of the hash value $\{S_i\}$ is stored.

$$S_1=\text{hash}(KS_1), S_2=\text{hash}(S_1), \ldots, S_{n-1}=\text{hash}(S_{n-2}), S_n=\text{hash}(S_{n-1})$$

The above-described hash sequence is called a forward hash sequence.

2) A hash function is applied to $KS_2$ n iterations, and the sequence of the hash value $\{M_i\}$ which starts from the last hash value is stored.

$$M_1=\text{hash}(M_2), M_2=\text{hash}(M_3), \ldots, M_{n-1}=\text{hash}(M_n), M_n=\text{hash}(KS_2)$$

That is, $M_1$ is the n-th hash value of $KS_2$, and $M_2$ is the (n−1)-th hash value of $KS_2$. This hash sequence is called a backward hash sequence.

3) $AVP=\{S_i, M_j\}$

Here, i indicates an index (sequence number) of the first TEK that can be used by a user among the sequences of n TEKs, and j indicates an index (sequence number) of the last TEK that can be used by the user among the sequences of n TEKs.

On the other hand, when the key materials are mapped, the SEK may be mapped on a single SAVP (=KSP) (i.e. KSP LT=SEK LT: n TEKs are derived from the KSP), or on a plurality of SAVPs ($SAVP_1=KSP_1$, $SAVP_2=KSP_2$, ... ). Also, the PEK may be mapped on a signal PAVP derived from the related SAVP, or on a plurality of PAVP derived from the respective related SAVPs.

Also, in the BSM, n TEKs may be generated from forward and backward hash sequences as follows.

$$TEKi = S_i \text{ XOR } M_j$$

Here, XOR is a bitwise exclusive OR operation.

In a terminal, m TEKs in $[S_i, M_j]$ are calculated as follows. That is, m number of $S_{i+x}$ values are calculated with respect to all x in an interval of [1,m], and m number of $M_{j-x}$ values are calculated with respect to all x in the interval of [1,m]. Finally, ($TEKx=Sx$ XOR $M_x$) is calculated with respect to in an interval of [i,i+m].

On the other hand, in order to satisfy diverse requirements for security protocols, different types of hash functions may be used for the TEK derivation, and the output of the hash function may be truncated.

Figure 3:
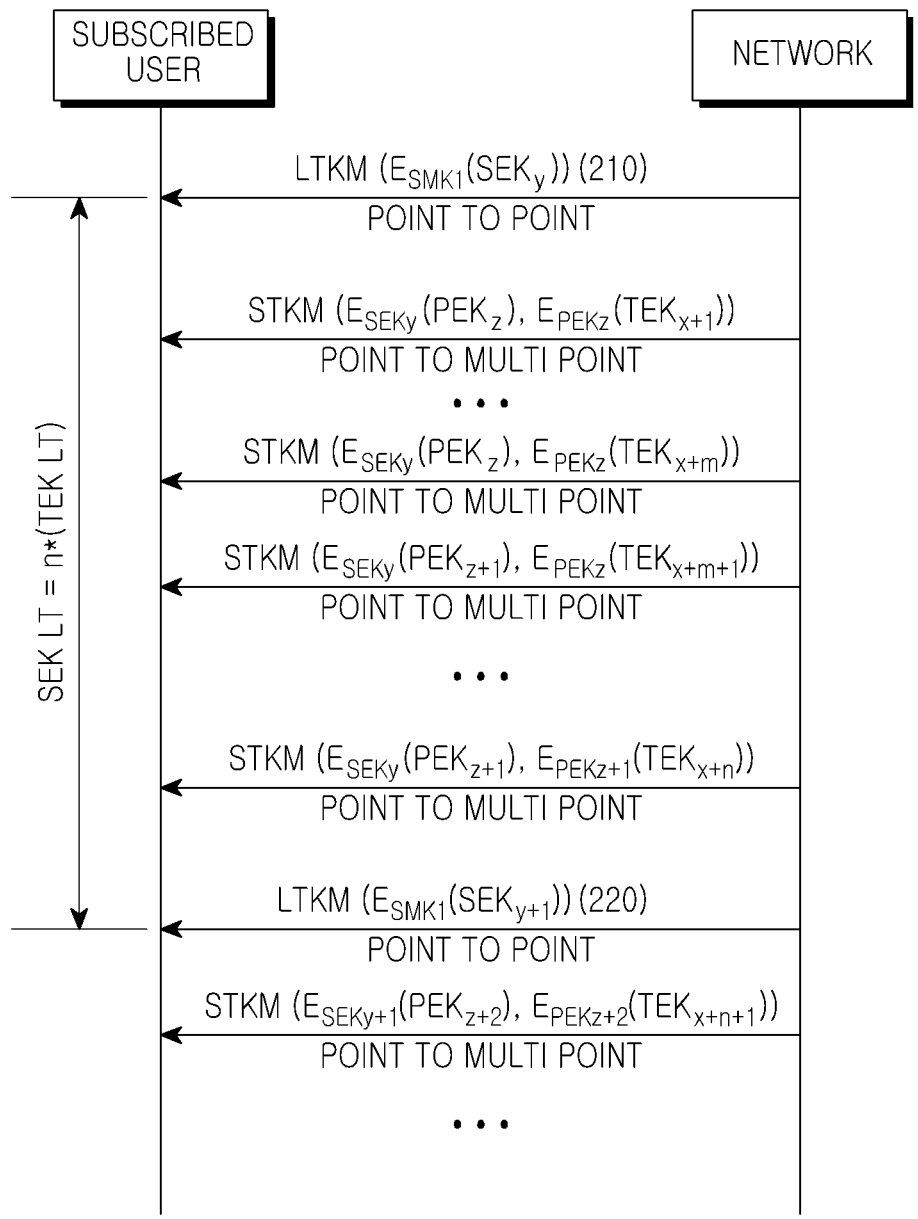
FIG. 3 is a flowchart illustrating the providing of PEK/TEK to a general PPV user.
Figure 4:
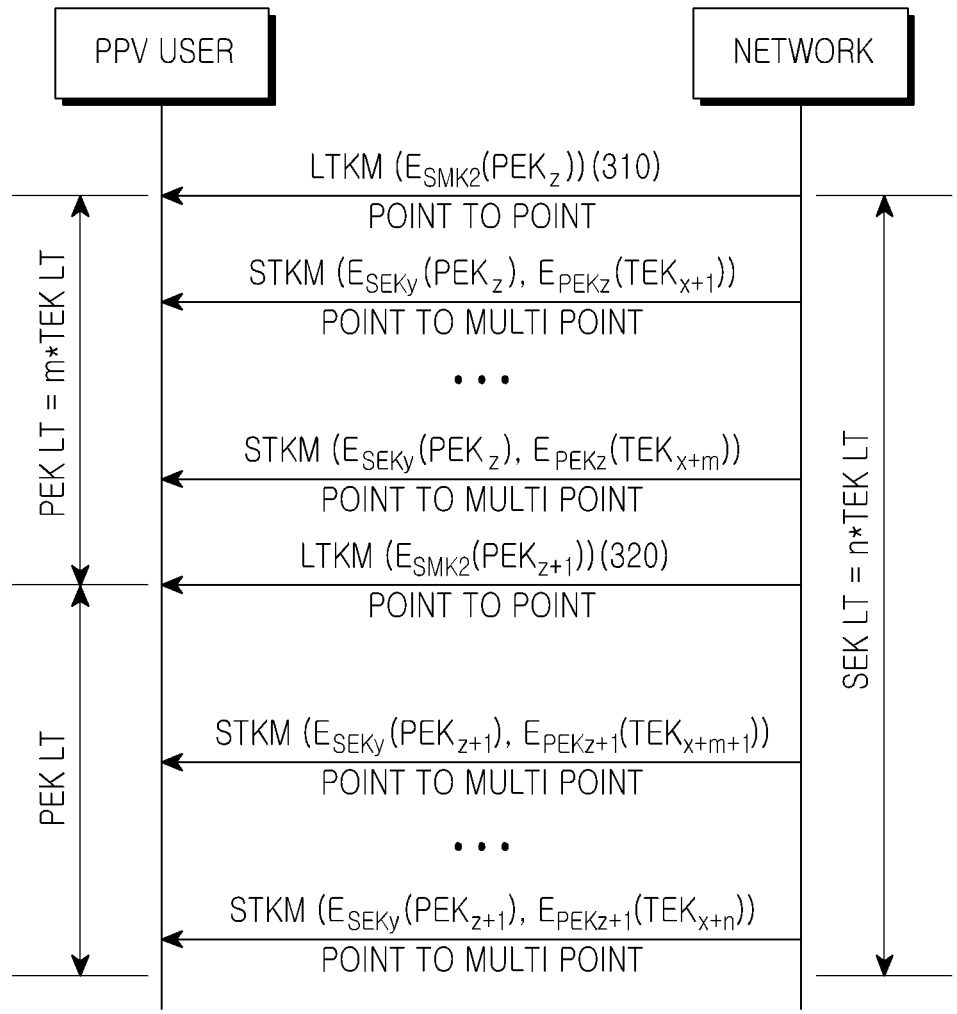
FIG. 4 is a flowchart illustrating the providing of PEK/TEK to a general PPV user.
Figure 6:
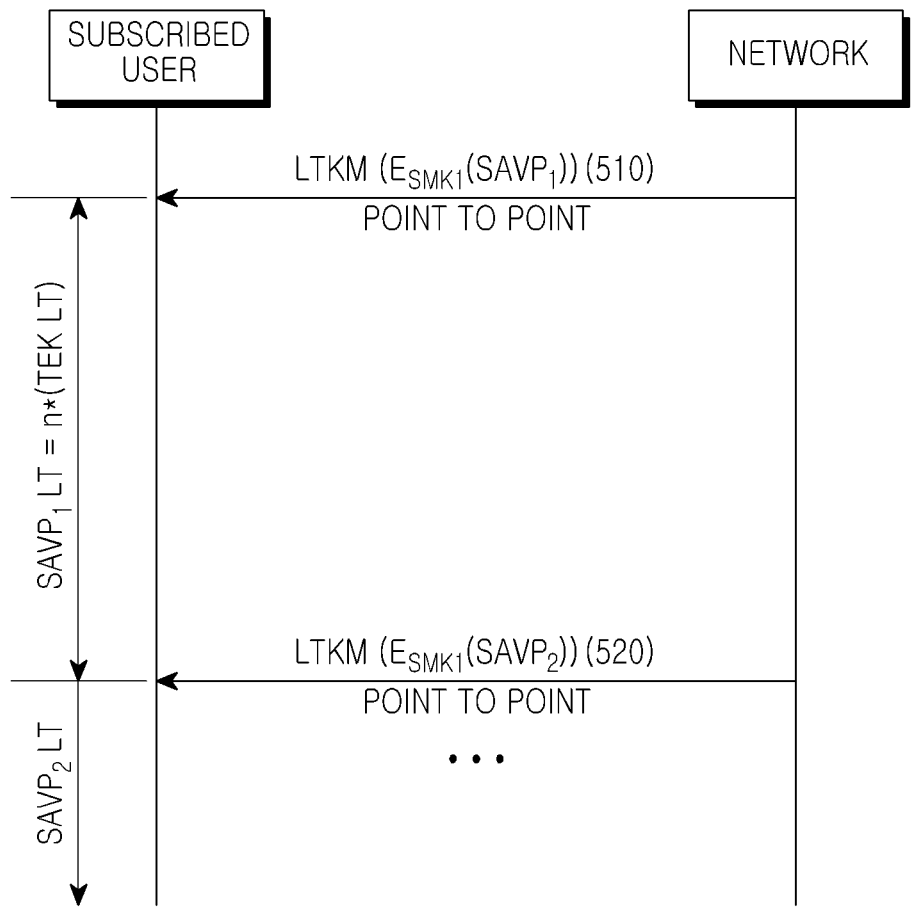
FIG. 6 is a flowchart illustrating the providing of AVP to a subscribed user according to an embodiment of the present invention.
Figure 7:
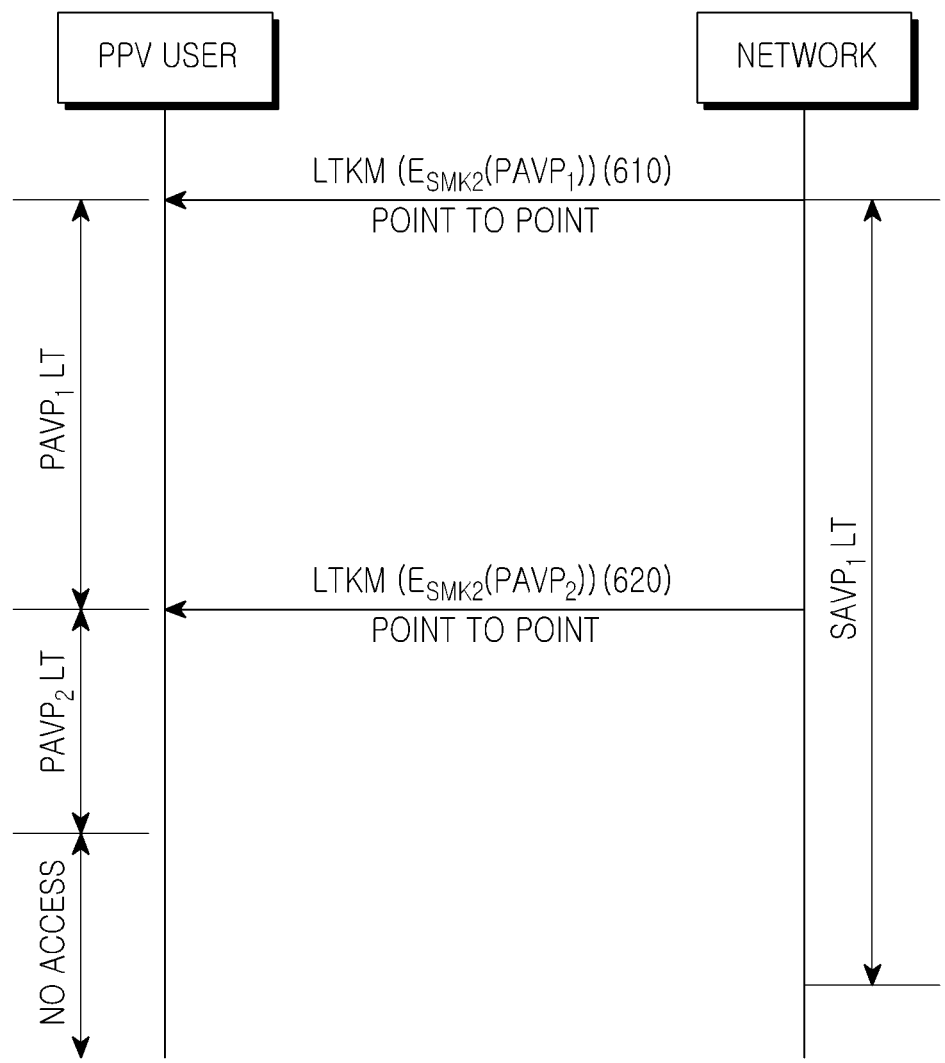
FIG. 7 is a flowchart illustrating the providing of AVP to a PPV user according to an embodiment of the present invention.

FIGS. 6 and 7 illustrate examples of key distribution according to an embodiment of the present invention. The conditions in FIGS. 6 and 7 are the same as those in FIGS. 3 and 4.

FIG. 6 illustrates a SAVP providing flow in subscription-based access conditions according to an embodiment of the present invention.

In the subscription-based access conditions according to an embodiment of the present invention, the lifetime of the SAVP is calculated to be n multiplied by the lifetime of the TEK. That is, n TEKs may be generated from the SAVP. When the service is first provided, the BSM generates a new $SAVP_1$, and transmits the new $SAVP_1$ to a subscribed user through the LTKM in step 510. The $SAVP_1$ is encrypted according to the $SMK_1$ that is shared only between the user and the BSM. Also, the BSM generates a new $SAVP_2$ before the $SAVP_1$ expires, and transmits the new $SAVP_2$ to the subscribed user through the LTKM in step 520. The $SAVP_2$ is also encrypted according to the $SMK_1$ that is shared only between the user and the BSM.

FIG. 7 illustrates a SAVP providing flow in PPV-based access conditions according to an embodiment of the present invention.

In the PPV-based access conditions according to an embodiment of the present invention, the lifetime of the PPV (PAVP LT) is calculated to be m multiplied by the lifetime of the TEK (where m≤n). In FIG. 6, two PAVPs ($PAVP_1$ and $PAVP_2$) derived from the $SAVP_1$ are illustrated, but many more PAVPs may exist. The user should issue separate purchase requests to the respective PAVPs. If the user performs the first purchase before starting an access to the content, the BSM transmits $PAVP_1$ to the user through the LTKM in step 610. Also, if the user issues the second purchase request before the $SAVP_1$ expires and if the purchase is successfully performed, the BSM transmits $PAVP_2$ to the user through the LTKM in step 620. If a further purchase request is not issued by the user before the $SAVP_2$ expires, the BSM does not transmit the PAVP to the user, and thus the user cannot access the content any more.

Next, a key identification method according to an embodiment of the present invention will be described.

Table 1 represents a mapping relationship between key identifiers according to an embodiment of the present invention and key identifiers of a smart card profile.

TABLE 1

| Smart Card Profile | | Key Mapping according to an embodiment of the present invention | |
|---|---|---|---|
| Key | Identifier | Key | Identifier |
| SMK | IDr and IDi (IDr identifies security relation between user terminal and BSM) | SMK | Not Changed |
| None | | KSP | Key Domain ID and KSP ID KSP ID = Key group/key number (See SEK ID) |
| SEK | Key Domain ID and SEK ID (Key Domain ID = Mobile Country Code Mobile network code, SEK ID = Key Group/Key Number Key Group = Group Identifier Key Number = Key Group/Key Number) | SAVP | Key Domain ID + DSP ID + TEK $ID_{LOW}$ + TEK $ID_{HIGH}$ |
| PEK | Key Domain ID + PEK ID, PEK ID = Key Group/Key Number | PAVP | Key Domain ID + KSP ID + TEK $ID_{LOW}$ + TEK $ID_{HIGH}$ |
| TEK | Key Domain ID_SEK ID + TEK ID TEK ID = Key Sequence Number | TEK | Not Changed |

Next, an LTKM format according to an embodiment of the present invention will be described.

In the embodiment of the present invention, SEK and PEK are replaced by SAVP and PAVP, respectively, and thus they should be carried through the LTKM. On the other hand, the STKMs that transmit the TEKs are not required any more except for the STKM management data. The STTKM management data includes access criteria information and attributes linked to other encrypted content. If the STKM management data is copied onto the LTKM, the STKSs can be removed.

Figure 8:
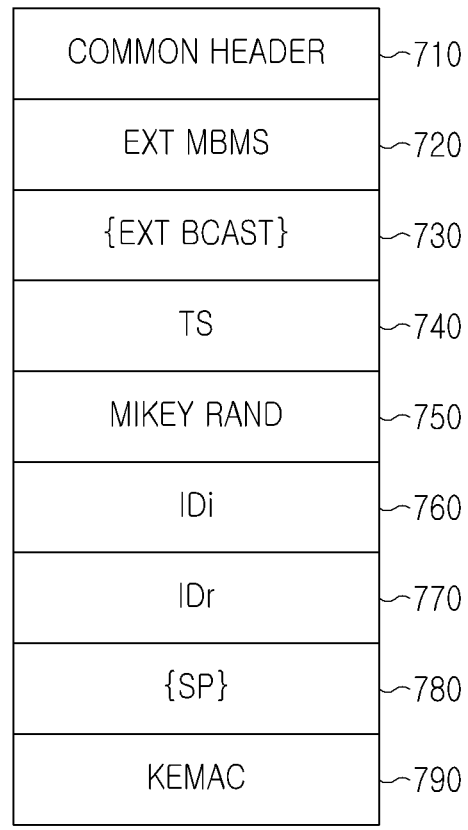
FIG. 8 is a block diagram illustrating a high-level LTKM structure according to an embodiment of the present invention.

FIG. 8 is a block diagram illustrating a high-level LTKM format according to an embodiment of the present invention.

The LTKM according to an embodiment of the present invention is transmitted through a MIKEY (Multimedia Internet KEYing) protocol (RFC 3830), and is formed according to the MIKEY rule. The message structure is not changed in comparison to the smart card profile, but content of some fields is changed. In the embodiment of the present invention, only LTKMs that include management data, in {EXT BCAST} 730, are considered, and the LTKMs that do not include the management data are formatted as described in the present smart card profile.

As compared with the smart card profile, the unchanged fields are as follows. The Common header 710 field is a MIKEY message header. The TS 740 field is a counter used to detect replay attack. The MIKEY RAND 750 field is an arbitrary value used for replay protection, key encoding, and key generation. The IDi 760 field is an identifier of the security relationship between terminal and BSM. The IDr 770 field is a BSM identifier. The {SP} 780 field is a Secure Realtime Transmission Protocol (SRTP) encoding protocol specifying parameters.

Parameters of which the change is required are as follows:

The EXT MBMS 720 parameter includes a key domain ID and a key type ID. The key domain ID sub payload is the same as that in the related art, and the SEK/PEK ID is replaced by the KSP ID in the key type ID sub payload.

The {EXT BCAST} 730 parameter is LTKM management data, and the changed format follows Table 2 below.

The KEMAC 790 is keying and message authentication material. SEK/PEK is replaced by one or more AVPs (for example, in the case where the salt value is required by the security protocol). $TS_{LOW}$ and $TS_{HIGH}$ of the SEK/PEK validity are replaced by TEK $ID_{LOW}$ and TEK $ID_{HIGH}$ of AVP validity measured from the number of TEKs that can be derived from the AVP, and TEK $ID_{LOW}$ and TEK $ID_{HIGH}$ are called AVP validity data VL.

Next, the LTKM management data according to an embodiment of the present invention will be described.

TABLE 2

| Smart card profile LTKM management data | Length(bit) | |
|---|---|---|
| LTKM management data( ) { | | |
| protocol_version | 4 | uimsbf |
| security_policy_ext_flag | 1 | bslbf |
| consumption_reporting_flag | 1 | bslbf |
| access_criteria_flag | 1 | uimsbf |
| terminal_binding_flag | 1 | bslbf |
| traffic_key_descriptor_flag | 1 | bslbf |
| if (security_policy_ext_flag == LTK_FLAG_TRUE) { | | |
| security_policy_extension | 8 | uimsbf |
| purse_flag | 1 | bslbf |
| reserved_for_future_use | 7 | uimsbf |
| if security_policy_extension == 0x00_0x01_0x02_0x03_0x08_0x09) { | | |
| cost_value | 16 | uimsbf |
| } | | |
| if security_policy_extension == 0x0C) { | | |
| add_flag | 1 | bslbf |
| keep_credit_flag | 1 | bslbf |
| number_TEKS | 22 | uimsbf |
| } | | |

TABLE 2-continued

| Smart card profile LTKM management data | Length(bit) | |
|---|---|---|
|     if security_policy_extension == 0x0D) { | | |
|         add_flag | 1 | bslbf |
|         number_TEKs | 23 | uimsbf |
|     } | | |
|     if (security_policy_extension == 0x07) { | | |
|         add_flag | 1 | bslbf |
|         number_playback | 7 | uimsbf |
|     } | | |
|     if (purse_flag == LTK_FLAG_TRUE) { | | |
|         purse_mode | 1 | bslbf |
|         token_value | 31 | uimsbf |
|     } | | |
| } | | |
| if (access_criteria_flag == LTK_FLAG_TRUE) { | | |
|     reserved_for_future_use | 8 | bslbf |
|     number_of_access_criteria_descriptors | 8 | uimsbf |
|     access_criteria_descriptor_loop( ) { | | |
|     access_criteria_descriptor( ) | | |
|     } | | |
| } | | |
| if (terminal_binding_flag == LTK_FLAG_TRUE) { | | |
|     terminalBindingKeyID | 32 | uimsbf |
|     permissionsIssuerURILength | 8 | uimsbf |
|     permissionsIssuerURI | 8*permissionIs | bslbf |
| } | | |
| if (consumption_reporting_flag == LTK_FLAG_TRUE) { | | |
|     security_policy_extension | 8 | uimsbf |
| } | | |
| if (traffic_key_descriptor_flag == LTK_FLAG_TRUE) { | | |
|     number_of_traffic_key_descriptors | 16 | uimsbf |
|     traffic_key_descriptor_loop( ){ | | |
|         traffic_key_identifier_low | 16 | uimsbf |
|         traffic_key_identifier_high | | |
|     traffic_key_lifetime | 4 | uimsbf |
|     protection_after_reception | 2 | uimsbf |
|     access_criteria_flag | 1 | uimsbf |
|     traffic_protection_protocol | 3 | uimsbf |
|     traffic_authentication_flag | 1 | uimsbf |
|     if (access_criteria_flag == LTK_FLAG_TRUE) { | | |
|         reserved_for_future_use | 8 | bslbf |
|         number_of_access_criteria_descriptors | 8 | uimsbf |
|         access_criteria_descriptor_loop( ) { | | |
|         access_criteria_descriptor( ) | | |
|         } | | |
|     } | | |
|     } | | |
| } | | |
| } | | |

Table 2, as above, represents a smart card profile LTKM management data format according to an embodiment of the present invention.

In Table 2, protocol_version, security_policy_ext_flag, consumption_reporting_flag, access_criteria_flag, and terminal_binding_flag are inherited from the legacy LTKM format, and these flags are used without any change as described in the smart card profile. Among them, security_policy_ext_flag field indicates whether there is security policy extension, and the security policy extension generally defines how a fee for content consumption is charged to a user. Also, if any one of the flags is set to LTK_FLAG_TRUE, other fields belonging to the LTKM are used in the same manner as the smart card profile.

The original LTKM already includes content access rules called access criteria descriptors. However, if specified access criteria are defined with respect to a single content encrypted by one or more related TEKs, they should be individually specified as described in the STKM. For this, the following new fields are included in the message:

The traffic_key_descriptor_flag field, which indicates whether traffic key descriptors belong to the LTKM.

The number_of_traffic_key_descriptors field, which indicates the number of traffic key descriptors.

The traffic_key_identifier_low( ) field, which defines traffic key descriptors including access criteria and parameters related to one or more other TEKs.

The traffic_key_identifier_low field, which indicates the TEK sequence number that indicates the first TEK sequence among the TEK sequences to which the traffic key descriptors are applied. In this case, it is assumed that the TEKs are sequentially used one by one according to their sequence number.

The traffic_key_identifier_high-field, which indicates the TEK sequence number that indicates the last TEK sequence among the TEK sequences to which the traffic key descriptors are applied.

The following fields are accommodated in the short key message STKM without any change: protection_after_reception, access_criteria_flag, traffic_protection_protocol, traffic_key_lifetime, traffic_authentication_tag, reserved_for_future_use, number_of_access_criteria_descriptors, access_criteria_descriptor.

Next, the LTKM process on the user side will be described.

The LTKMs are processed by a security function provided in the smart card or terminal.

Figure 9:
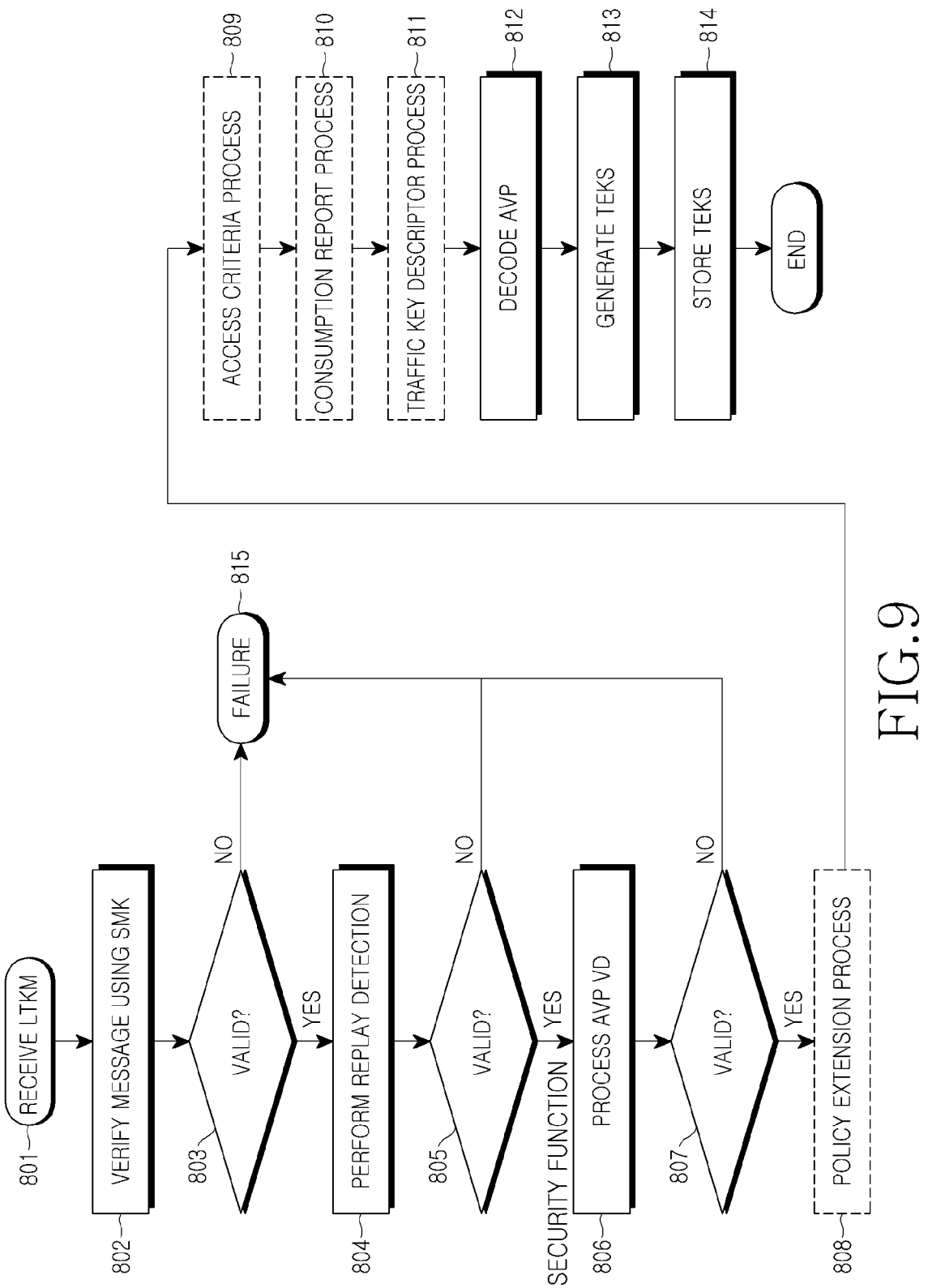
FIG. 9 is a block diagram illustrating a LTKM process in a terminal according to an embodiment of the present invention.

FIG. 9 is a block diagram illustrating a LTKM process in a terminal according to an embodiment of the present invention.

If the terminal receives LTKM in step 801, it performs message validation using the SMK in step 802, and then confirms whether the message is valid in step 803.

If the message is valid, the terminal performs the LTKM replay detection procedure in step 804, and then judges whether the detected replay is valid in step 805.

If the replay is valid, the terminal sends the LTKM to the security function, and the security function confirms whether the AVP data is valid, i.e. whether TEK $ID_{LOW}$ is smaller than TEK $ID_{HIGH}$, in step 806. If the AVP data is not valid, the terminal proceeds to step 815, removes the whole context related to the given KSP ID, i.e. SAVP/PAVP, TEKs, stored policy extension, and the like, and ends the LTKM process.

In step 807, if the AVP data is valid, the security function processes the LTKM based on the value of security_policy_extension in the case where security_policy_ext_flag=LTK_FLAG_TRUE in step 808. "TS high" of the SEK/PEK validity and the security policy extensions that depend on the TS used in the STKM use the TEK $ID_{HIGH}$ of the TEK ID of the currently used TEK. In general, the LTKM is processed based on the TEK IDs instead of the time stamps.

In step 809, if it is determined that access_criteria_flag=LTK_FLAG_TRUE, the security function processes the access control descriptors. Also, if the related flag is set to LTK_FLAG_TRUE, the security function performs the consumption report in step 810, and if it is determined that traffic_key_descriptor_flag=LTK_FLAG_TRUE, the security function processes the traffic key descriptors in step 811.

That is, with respect to the respective traffic key descriptors, the security function identifies the TEK sequence to which the present traffic key descriptor is applied by confirming the traffic_key_identifier_low and traffic_key_identifier_high, processes the access criteria and other content attributes, and then stores them together with the related TEK IDs.

Next, the security function decodes the SAVP/PAVP in step 812, derives the TEKs in step 813, and stores them together with other attributes processed in the previous steps in step 814. Also, the security function may derive the necessary TEK according to terminal requirements.

Next, the TEK request procedure by the terminal will be described.

The terminal requests the TEK from the security function whenever a new TEK is required for the content decoding. As defined in the smart card profile, the security function generally provides the TEK to the terminal in response to the STKM of the terminal. However, in the embodiment of the present invention, the STKMs are no longer used, and thus a new message for requesting the TEK should be defined. In the present invention, such a message is called a "TEK request" message.

The TEK request message includes a key domain ID, a KSP ID, and a TEK ID. Also, the TEK request message may also include other parameters according to the request. For example, if the TEK request message is bound in the terminal, it may include a Terminal Binding Key (TBK) identifier and a message authentication code.

Figure 10:
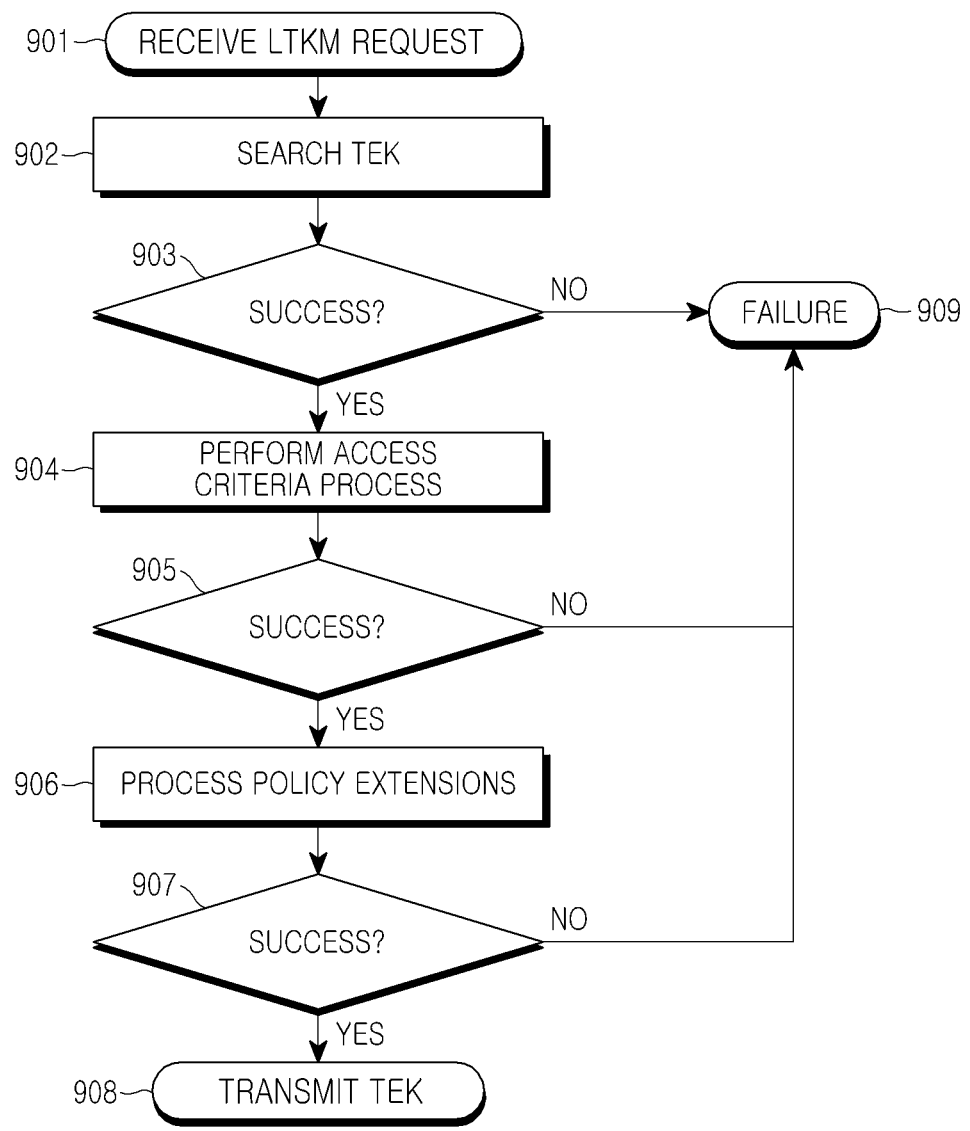
FIG. 10 is a flowchart illustrating a TEK request process by a security function according to an embodiment of the present invention.

FIG. 10 is a flowchart illustrating a TEK request process in which a security function according to an embodiment of the present invention requests the TEK from the terminal.

If the security function requests the TEK request from the terminal in step 901, the security function searches (or generates) the related TEK based on the key domain ID, the KSP ID, and the TEK ID in step 902. If the TEK search succeeds in step 903, the security function proceeds to step 904, and processes the TEK and the related access criteria in the same manner as defined in the access criteria process in the smart card profile. For example, if the SAVP/PAVP related access criteria and the TEK specified access criteria are provided, the security function compares them, and if a PIN validation is required, the security function performs the PIN validation. If the TEK search fails, the security function sends a failure indication to the terminal in step 909. In this case, the security function does not provide the TEK.

The security function confirms whether the access criteria process has succeeded in step 905, and if succeeded, the security function processes the request based on the security policy extension related to the related SAVP/PAVP in step 906 (See STKM process of the smart card profile). In step 907, if the access criteria process has failed, the security function sends a failure indication to the terminal of step 909, but it does not provide the TEK.

The security function confirms whether the policy extension process has succeeded in step 907, and if succeeded, the security function transmits the TEK to the terminal in step 908, and if failed, the security function sends the failure indication to the terminal in step 909.

Although several embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method of distributing an encryption key for protecting a broadcasting service in a mobile broadcasting system, comprising the steps of:

generating, by a network, first information for encryption key derivation in response to providing the broadcasting service to a terminal, and transmitting a long term key message including the generated first information to the terminal; and generating, by the network, second information for encryption key derivation before a lifetime of the first information expires, and transmitting a long term key message including the generated second information to the terminal, wherein the lifetime of the first information and a lifetime of the second information are an integer multiple of a lifetime of a traffic encryption key, the first information and the second information derive a plurality of traffic encryption keys, and the first information and the second information are derived from at least one key seed pair (KSP) composed of $KS_1$, $KS_2$ arbitrarily generated in the network, and wherein the traffic encryption key is calculated based on a hash value of $KS_1$ to which a hash function is applied and a hash value of $KS_2$ to which a hash function is applied, and wherein a message sent for requesting the traffic encryption key includes at least one of a key domain ID and a KSP ID.

2. The method as claimed in claim 1, wherein the first information and the second information are encrypted based on a subscriber management key that is shared between the terminal and the network.

3. The method as claimed in claim 1, wherein the first information and the second information are program encryption key information derived from service encryption key information, and the network transmits a long term key message that includes the first information and the second information to the terminal based on a terminal purchase request for the first information and the second information.

4. The method as claimed in claim 3, further comprising receiving, by the network, a purchase request of the second information from the terminal before the lifetime of the first information expires.

5. A method of distributing an encryption key for protecting a broadcasting service in a mobile broadcasting system, comprising the steps of:
   verifying, by a terminal, a long term key message using a subscriber management key if the long term key message is received from a network;
   performing, by the terminal, replay detection if the long term key message is valid;
   confirming, by the terminal, validity of information for encryption key derivation included in the long term key message using a security function if the replay detection succeeds; and
   decoding, by the terminal, the information, generating and storing a traffic encryption key from the information if the information is valid,
   wherein a lifetime of the information is an integer multiple of a lifetime of a traffic encryption key, a plurality of the traffic encryption keys are derived from the information, and the information is derived from a key seed pair (KSP) composed of $KS_1$, $KS_2$ arbitrarily generated in the network,
   wherein the traffic encryption key is calculated based on a hash value of $KS_1$ to which a hash function is applied and a hash value of $KS_2$ to which a hash function is applied, and
   wherein a message sent for requesting the traffic encryption key includes at least one of a key domain ID and a KSP ID.

6. The method as claimed in claim 5, further comprising the steps of:
   transmitting, by the terminal, a request message for requesting new traffic encryption key to the security function; and
   receiving, by the terminal, the new traffic encryption key from the security function in response to the request message.

7. The method as claimed in claim 6, wherein the request message for requesting the new traffic encryption key includes a key domain ID and a traffic encryption key ID.

8. A network for distributing an encryption key for protecting a broadcasting service in a mobile broadcasting system, the network comprising:
   a controller configured to generate first information for encryption key derivation in response to providing the broadcasting service to a terminal, and generate second information for encryption key derivation before a lifetime of the first information expires; and
   a transmitter configured to transmit a long term key message including the generated first information to the terminal, and transmit a long term key message including the generated second information to the terminal,
   wherein the lifetime of the first information and a lifetime of the second are an integer multiple of a lifetime of a traffic encryption key, the first information and the second information derive a plurality of traffic encryption keys, and the first information and the second information are derived from at least one key seed pair (KSP) composed of $KS_1$, $KS_2$ arbitrarily generated in the network,
   wherein the traffic encryption key is calculated based on a hash value of $KS_1$ to which a hash function is applied and a hash value of $KS_2$ to which a hash function is applied, and
   wherein a message sent for requesting the traffic encryption key includes at least one of a key domain ID and a KSP ID.

9. The network as claimed in claim 8, wherein the first information and the second information are encrypted based on a subscriber management key that is shared between the terminal and the network.

10. The network as claimed in claim 8, wherein the first information and the second information are program encryption key information derived from service information, and the transmitter transmits a long term key message that includes the first information and the second to the terminal based on a terminal purchase request for the first information and the second information.

11. The network as claimed in claim 10, further comprising a receiver, the receiver receives a purchase request of the second information from the terminal before the lifetime of the first information expires.

12. A terminal for distributing an encryption key for protecting a broadcasting service in a mobile broadcasting system, the terminal comprising:
   a processor configured to verify a long term key message using a subscriber management key if the long term key message is received from a network, perform replay detection if the long term key message is valid, confirm validity of information for encryption key derivation included in the long term key message using a security function if the replay detection succeeds, decode the information, and generate and store a traffic encryption key from the information if the information is valid,
   wherein a lifetime of the information is an integer multiple of a lifetime of a traffic encryption key, a plurality of traffic encryption keys are derived from the information, and the information is derived from a key seed pair (KSP) composed of $KS_1$, $KS_2$ arbitrarily generated in the network,
   wherein the traffic encryption key is calculated based on a hash value of $KS_1$ to which a hash function is applied and a hash value of $KS_2$ to which a hash function is applied, and
   wherein a message sent for requesting the traffic encryption key includes at least one of a key domain ID and a KSP ID.

13. The terminal as claimed in claim 12, wherein the processor transmits a request message for requesting a new traffic encryption key to the security function, and receives the new traffic encryption key from the security function in response to the request message.

14. The terminal as claimed in claim 12, wherein the request message for requesting the new traffic encryption key includes a key domain ID and a traffic encryption key ID.

\* \* \* \* \*